A. RECORD.
Seed-Planter.

No. 211,182. Patented Jan. 7, 1879.

WITNESSES:
Chas. Nida
C. Sedgwick

INVENTOR:
A. Record
BY Munn & Co.
ATTORNEYS.

UNITED STATES PATENT OFFICE.

ALPHONSO RECORD, OF FARMINGTON, MINNESOTA, ASSIGNOR TO HIMSELF AND EDWIN G. RECORD, OF SAME PLACE.

IMPROVEMENT IN SEED-PLANTERS.

Specification forming part of Letters Patent No. 211,182, dated January 7, 1879; application filed August 27, 1878.

*To all whom it may concern:*

Figure 1:
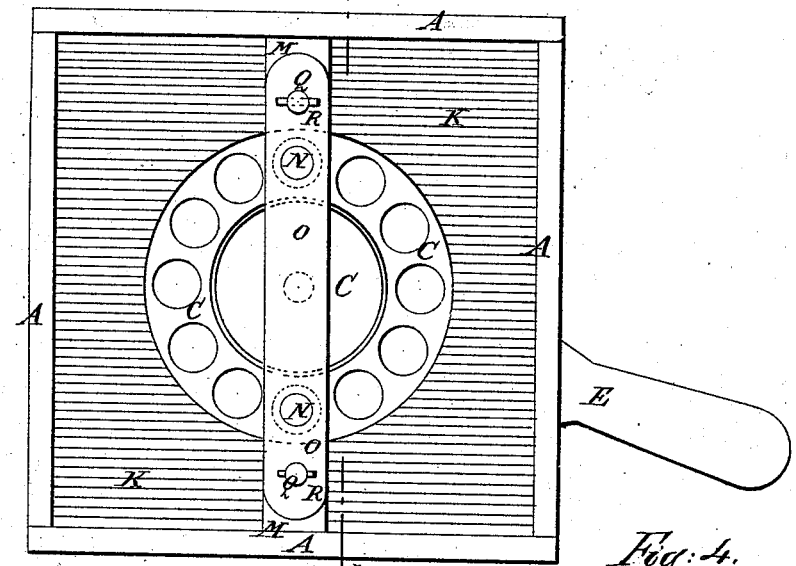
Figure 2:
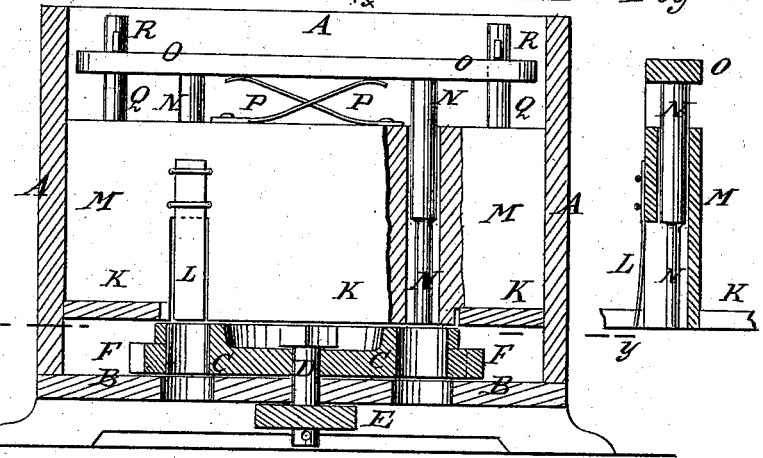
Figure 4:
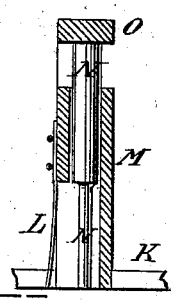
Figure 3:
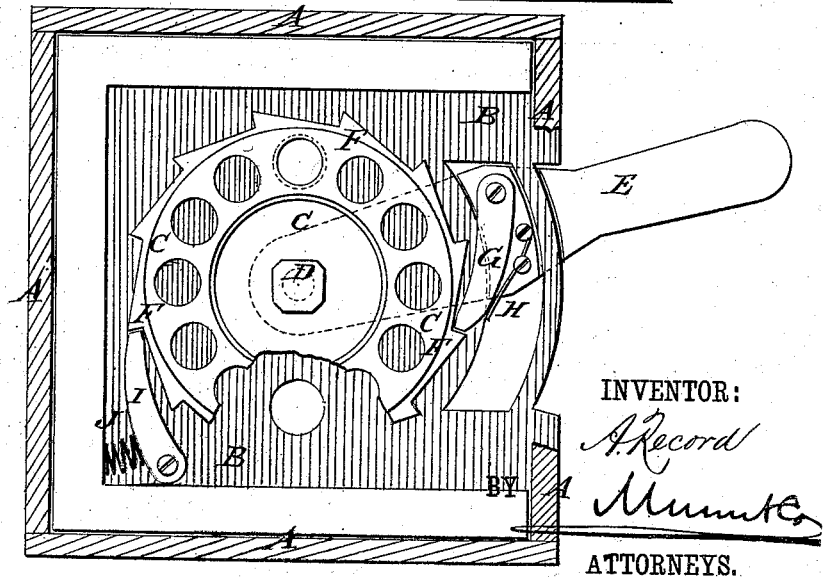

Be it known that I, ALPHONSO RECORD, of Farmington, in the county of Dakota and State of Minnesota, have invented a new and useful Improvement in Seed-Droppers, of which the following is a specification:

Figure 1 is a top view of my improved seed-dropper. Fig. 2 is a vertical section of the same, taken through the line $x\ x$, Fig. 1. Fig. 3 is a horizontal section of the same, taken through the line $y\ y$, Fig. 2. Fig. 4 is a detail section, showing a cut-off and a clearing-punch.

Similar letters of reference indicate corresponding parts.

The invention will first be described in connection with the drawing, and then pointed out in the claim.

A represents the seed-box, the bottom B of which is designed to be attached to the frame of the seed-planter. To the center of the bottom B is pivoted the dropping-wheel C by a bolt, D, which passes through its center and through the said bottom B. To the lower end of the bolt D is pivoted the inner end of the lever E, which passes through a guide-slot or keeper attached to the bottom B, and its outer end projects into such a position that it can be conveniently reached and operated by the attendant.

Upon the lever E is formed a shoulder, which moves along a convex notch in the edge of the bottom B, and by striking against the ends of the said notch limits the movement of the said lever.

The dropping-wheel C has a circle of holes formed through it, and is made of such a thickness that each of its said holes will hold the exact amount of seed required for a hill.

Upon the lower part of the edge of the seed-dropping wheel C are formed ratchet-teeth F, with which engages a pawl, G, pivoted to the lever E or to a block attached to said lever, the said pivot or block passing through a curved slot in the bottom B, as shown in Fig. 3.

The pawl G is held forward against the teeth F by a spring, H, attached to the lever E or to a block attached to the said lever, and which bears against the rear side of the said pawl G, as shown in Fig. 3.

The dropping-wheel C is kept from being turned back by the friction of the pawl G when the lever E is drawn back for another stroke by a pawl, I, pivoted to the bottom B and held forward against the teeth F by a spring, J, which bears against its rear side.

In the bottom B, upon the opposite sides of the pivot-bolt D, and in the line of the circle of holes through the dropping-wheel C, are formed two discharge-holes, through which the seed drops to the ground or into a conductor-spout that conducts it to the ground.

To the seed-box A, just above the dropping-wheel C, is attached a second or false bottom, K, through the middle part of which is formed a circular opening of such a size as to include the circle of seed-receiving holes in the wheel C.

The bottom K should be so close to the dropping-wheel C that the seed cannot escape between them.

By this arrangement the dropping-holes of the wheel C will be so long within the seed-box that the said holes will certainly become filled with seed before they come over the discharge-holes through the bottom B.

The dropping-holes of the wheel C are kept from carrying out any more seed than enough to fill them by the cut-offs L, which are attached to the partition M, that crosses the center of the seed-box A and is secured at its ends to the sides of the said seed-box A.

The partition M is recessed in the rear of the cut-offs L, to allow the said cut-offs to yield should a kernel get between them and the edges of the wheel C at the side of a dropping-hole.

The partition M is placed directly over the discharge-holes through the bottom B, and is perforated vertically in line with the said discharge-holes to receive the punches or pins N, the upper ends of which are attached to the cross-bar O. The cross-bar O is placed directly above the partition M, and is held up, holding the punches N above the dropping-wheel C, by springs P, placed between them and the said partition and attached to one or the other of the said parts.

The cross-bar O is kept in place by guide-pins Q attached to the partition M, and which pass through holes in the ends of the said cross-bar O. The upward movement of the cross-bar O is limited by keys R passed through the upper ends of the guide-pins Q, and against which the cross-bar O is held by the springs P.

By this construction, should the seed stick fast or wedge in the dropping-holes of the wheel C, the said holes may be cleared by forcing the punches N down through them. The cross-bar O may be forced down to operate the punches N by hand or by a mechanical device connected with the planter.

Having thus described my invention, I claim as new and desire to secure by Letters Patent—

In a seed-dropper, the combination of box A, having two holes at the bottom, the intermittently-rotating dropper C, centrally pivoted to said bottom, and having a circle of holes, the false bottom K, the guide-bar M, having two holes, and the two simultaneously-operating punches N, as shown and described, whereby the seed is dropped on both sides of furrow or in two parts of the hill.

ALPHONSO $\overset{\text{his}}{+}$ RECORD.
$\phantom{ALPHONSO\ }{\text{mark.}}$

Witnesses:
G. A. RECORD,
FRANK RATHBUN.